(12) United States Patent
Mir et al.

(10) Patent No.: US 9,265,268 B2
(45) Date of Patent: Feb. 23, 2016

(54) METHOD OF HANDLING BANANAS

(76) Inventors: Nazir Mir, North Brunswick, NJ (US); Deirdre Margaret Holcroft, Davis, CA (US); William Nixon James, Jr., Fort Washington, PA (US); Alvaro R. Ureña-Padilla, Cartago (CR); Bruce Menning, Midland, MI (US)

( * ) Notice: Subject to any disclaimer, the term of this patent is extended or adjusted under 35 U.S.C. 154(b) by 195 days.

(21) Appl. No.: 13/504,306

(22) PCT Filed: Dec. 22, 2010

(86) PCT No.: PCT/US2010/061779
§ 371 (c)(1),
(2), (4) Date: Apr. 26, 2012

(87) PCT Pub. No.: WO2011/082059
PCT Pub. Date: Jul. 7, 2011

(65) Prior Publication Data
US 2012/0282380 A1    Nov. 8, 2012

Related U.S. Application Data

(60) Provisional application No. 61/284,899, filed on Dec. 28, 2009, provisional application No. 61/425,479, filed on Dec. 21, 2010.

(51) Int. Cl.
*A23B 7/152* (2006.01)
*A23B 7/154* (2006.01)

(52) U.S. Cl.
CPC ............... *A23B 7/152* (2013.01); *A23B 7/154* (2013.01); *A23V 2002/00* (2013.01)

(58) Field of Classification Search
CPC ............................... A23B 7/152; A23B 7/154
USPC ......... 426/106, 112, 118, 324, 326, 392, 418, 426/419
See application file for complete search history.

(56) References Cited

U.S. PATENT DOCUMENTS

| 2002/0127305 A1 | 9/2002 | Clarke |
| 2006/0154822 A1 | 7/2006 | Toivonen et al. |

FOREIGN PATENT DOCUMENTS

| WO | 9533377 A1 | 12/1995 |
| WO | 2009002407 A1 | 12/2008 |
| WO | 2009031992 A1 | 3/2009 |

OTHER PUBLICATIONS

Bagnato, N., Barrett, M., Klieber, A., The effects on the quality of Cavendish bananas, which have been treated with ethylene, of exposure to 1-methylcyclopropene, International Journal of Food Science and Technology 2003, 38, 745-750.*
Yueming Jiang et al., "Extension of the shelf life of banana fruit by1-methylcyclopropene in combination with polyethylene bags," Postharvest Biology and Technology 1999, pp. 187-193, vol. 16. No. 2.
International Search Report for International Application No. PCT/US2010/061779, dated Apr. 11, 2011, 3 pages.
Written Opinion for International Application No. PCT/US2010/061779, dated Apr. 11, 2011, 5 pages.
International Preliminary Report on Patentability for International Application No. PCT/US2010/061779, dated Jul. 4, 2012, 6 pages.
Basel, R.M., Long shelf life banana storage using MAP storage coupled with postharvest MCP treatment, Institute of Food Technologist, 2002.
Lee, D. S., et al., CRC Press article Permeation of Gas and Vapor, Food packaging Science and Technology, 2008, pp. 100-101.

* cited by examiner

*Primary Examiner* — Rena L Dye
*Assistant Examiner* — Chaim Smith
(74) *Attorney, Agent, or Firm* — Magleby Cataxinos & Greenwood

(57) ABSTRACT

There is provided a method of storing bananas comprising the steps of
(a) exposing said bananas to an atmosphere that contains one or more ethylene-active compound, and
(b) after said step (a), exposing said bananas to an atmosphere that contains one or more cyclopropene compound while said bananas have color stage 2 to 6 on the seven-stage scale,
wherein said bananas are kept in a modified-atmosphere package for a time period that includes at least a time interval that lasts for 1 hour, wherein said time interval begins between the conclusion of said step (b) and 72 hours from the conclusion of said step (b), and
wherein said modified-atmosphere package is constructed so that the transmission rate of carbon dioxide for the entire package (PCT) is from 2,400 to 120,000 cubic centimeters per day per kilogram of bananas.

20 Claims, No Drawings

METHOD OF HANDLING BANANAS

BACKGROUND

Bananas are normally harvested by cutting a bunch of bananas from the pseudostem on which it grew. Subsequent to harvest, bunches are often broken down into smaller connected groups called "hands" or, synonymously, "clusters." It is common to harvest and then ship bananas while the peels are green. Long-distance shipment is often performed at low temperature (for example, at 14° C.). Bananas are considered to ripen very slowly during such shipment, during which the bananas normally remain green.

It is also common, once the bananas have reached a location near where they will be sold, to place them in an enclosed volume and expose them to ethylene gas. Typical ethylene exposure is 24-48 hours at 14-18° C. in an atmosphere that contains ethylene at concentration of 100-1000 microliter per liter (ppb). After the exposure to ethylene, the bananas normally ripen more quickly. As the bananas ripen during a normal ripening process, the peels gradually turn yellow; the peels remain yellow for some time; then the peels develop a small number of black spots; and eventually the bananas become undesirably over-ripe.

It is desirable to maintain bananas for as long as possible in a desirable condition (i.e., a condition in which they are desirable to consumers). Bananas in that condition are ripe but have not developed undesirable post-ripening characteristics such as, for example, one or more of the following: peel with a large number of black spots, black peel, pulp that has turned undesirably brown, or pulp that has turned undesirably soft.

R. M. Basel, et. al., in "Long Shelf Life Banana Storage Using MAP Storage Coupled With Postharvest MCP Treatment" (Institute of Food Technologists, 2002 Annual Meeting and Food Expo, available at http://ift.confex.com/ift/2002/techprogram/paper_13343.htm), describe the use of modified atmosphere package (MAP) and 1-methylcyclopropene (MCP). The methods of Basel, et. al., postpone the onset of ripening of bananas and, once ripening begins, extend the ripening process.

It is desired to provide methods in which bananas ripen sufficiently to become desirable for retail sale and/or consumption and in which bananas remain in such desirable condition for a longer time than in previous methods. It is particularly desired to find a method of storing and handling bananas that allows the bananas to remain for a longer time in condition that is desirable for eating.

STATEMENT OF THE INVENTION

In one aspect of the present invention, there is provided a method of handling bananas comprising the steps of:
(a) exposing said bananas to an atmosphere that contains one or more ethylene-active compound selected from the group consisting of ethylene, ethylene release agents, and compounds with high ethylene activity, and
(b) after said step (a), exposing said bananas to an atmosphere that contains one or more cyclopropene compound while said bananas have color stage 2 to 6 on the seven-stage scale,
wherein said bananas are kept in a modified-atmosphere package for a time period that includes at least a time interval that lasts for 1 hour, wherein said time interval begins between the conclusion of said step (b) and 72 hours from the conclusion of said step (b), and wherein said modified-atmosphere package is constructed so that the transmission rate of carbon dioxide for the entire package (PCT) is from 2,400 to 120,000 cubic centimeters per day per kilogram of bananas.

DETAILED DESCRIPTION

As used herein, "banana" refers to any member of the genus *Musa*, including, for example, bananas and plantains.

When a compound is described herein as being present as a gas in an atmosphere at a certain concentration using the unit "ppm," the concentration is given as parts by volume of that compound per million parts by volume of the atmosphere. Similarly, "ppb" (which is equivalent to microliters per liter) denotes parts by volume of that compound per billion parts by volume of the atmosphere.

As used herein, a "polymeric film" is an object made of polymer that is much smaller in one dimension (the "thickness") than in the other two dimensions and that has a relatively uniform thickness. Polymeric film typically has thickness of 1 mm or less.

The present invention involves the use of one or more cyclopropene compound. As used herein a cyclopropene compound is any compound with the formula

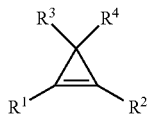

where each $R^1$, $R^2$, $R^3$ and $R^4$ is independently selected from the group consisting of H and a chemical group of the formula:

where n is an integer from 0 to 12. Each L is a bivalent radical. Suitable L groups include, for example, radicals containing one or more atoms selected from H, B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (i.e., any one of $R^1$, $R^2$, $R^3$ and $R^4$) the total number of heteroatoms (i.e., atoms that are neither H nor C) is from 0 to 6.

Independently, in any one R group the total number of non-hydrogen atoms is 50 or less.

Each Z is a monovalent radical. Each Z is independently selected from the group consisting of hydrogen, halo, cyano, nitro, nitroso, azido, chlorate, bromate, iodate, isocyanato, isocyanido, isothiocyanato, pentafluorothio, and a chemical group G, wherein G is a 3 to 14 membered ring system.

The $R^1$, $R^2$, $R^3$ and $R^4$ groups are independently selected from the suitable groups. The $R^1$, $R^2$, $R^3$ and $R^4$ groups may be the same as each other, or any number of them may be different from the others. Groups that are suitable for use as one or more of $R^1$, $R^2$, $R^3$ and $R^4$ may be connected directly to the cyclopropene ring or may be connected to the cyclopropene ring through an intervening group such as, for example, a heteroatom-containing group.

As used herein, a chemical group of interest is said to be "substituted" if one or more hydrogen atoms of the chemical group of interest is replaced by a substituent. Suitable substituents include, for example, alkyl, alkenyl, acetylamino, alkoxy, alkoxyalkoxy, alkoxycarbonyl, alkoxyimino, carboxy, halo, haloalkoxy, hydroxy, alkylsulfonyl, alkylthio, trialkylsilyl, dialkylamino, and combinations thereof.

Among the suitable $R^1$, $R^2$, $R^3$ and $R^4$ groups are, for example, substituted and unsubstituted versions of any one of the following groups: aliphatic, aliphatic-oxy, alkylcarbonyl, alkylphosphonato, alkylphosphato, alkylamino, alkylsulfonyl, alkylcarboxyl, alkylaminosulfonyl, cycloalkylsulfonyl, cycloalkylamino, heterocyclyl (i.e., aromatic or non-aromatic cyclic groups with at least one heteroatom in the ring), aryl, hydrogen, fluoro, chloro, bromo, iodo, cyano, nitro, nitroso, azido, chlorato, bromato, iodato, isocyanato, isocyanido, isothiocyanato, pentafluorothio; acetoxy, carboethoxy, cyanato, nitrato, nitrito, perchlorato, allenyl; butylmercapto, diethylphosphonato, dimethylphenylsilyl, isoquinolyl, mercapto, naphthyl, phenoxy, phenyl, piperidino, pyridyl, quinolyl, triethylsilyl, and trimethylsilyl.

Among the suitable $R^1$, $R^2$, $R^3$ and $R^4$ groups are those that contain one or more ionizable substituent groups. Such ionizable groups may be in non-ionized form or in salt form.

Also contemplated are embodiments in which $R^3$ and $R^4$ are combined into a single group, which is attached to the number 3 carbon atom of the cyclopropene ring by a double bond. Some of such compounds are described in US Patent Publication 2005/0288189.

In preferred embodiments, one or more cyclopropenes are used in which one or more of $R^1$, $R^2$, $R^3$ and $R^4$ is hydrogen. In more preferred embodiments, each of $R^1$, $R^2$, $R^3$ and $R^4$ is hydrogen or methyl. In more preferred embodiments, $R^1$ is (C1-C4) alkyl and each of $R^2$, $R^3$, and $R^4$ is hydrogen. In more preferred embodiments, $R^1$ is methyl and each of $R^2$, $R^3$, and $R^4$ is hydrogen, and the cyclopropene compound is known herein as "1-MCP."

In preferred embodiments, a cyclopropene compound is used that has boiling point at one atmosphere pressure of 50° C. or lower; or 25° C. or lower; or 15° C. or lower. Independently, in preferred embodiments, a cyclopropene compound is used that has boiling point at one atmosphere pressure of −100° C. or higher; −50° C. or higher; or 25° C. or higher; or 0° C. or higher.

As used herein, an "ethylene-active" compound is a compound that is ethylene or is an ethylene release agent or is a compound with high ethylene activity.

As used herein, "modified-atmosphere packaging" ("MAP") is an enclosure that alters the gaseous atmosphere inside the enclosure from normal atmospheric composition when respiring produce is contained inside the enclosure. MAP is an enclosure in the sense that it is a package that may be lifted and transported with the produce contained within it. MAP may or may not allow exchange of gas with the ambient atmosphere outside the MAP. MAP may or may not be permeable to diffusion of any particular gas, independent of its permeability or non-permeability to any other gas.

As used herein, a "monomer" is a compound that has one or more carbon-carbon double bond that is capable of participating in a polymerization reaction. As used herein, an "olefin monomer" is a monomer, the molecules of which contain only atoms of carbon and hydrogen. As used herein, "polar monomer" is a monomer, the molecules of which contain one or more polar group. Polar groups include, for example, hydroxyl, thiol, carbonyl, carbon-sulfur double bond, carboxyl, sulfonic acid, ester linkages, other polar groups, and combinations thereof.

The method of the present invention involves contacting bananas with one or more ethylene-active compound. Suitable ethylene release agents include, for example, 2-chloroethylphosphonic acid (ethephon), abscisic acid, and other compounds that act in a similar way to affect abscission. Suitable compounds with high ethylene activity include, for example, propylene, vinyl chloride, carbon monoxide, acetylene, 1-butene, and other compounds with high ethylene activity. In preferred embodiments, exposure to ethylene-active compound is performed using ethylene.

The preferred temperature for performing exposure of bananas to ethylene-active compound is 13.3° C. or higher; more preferably 14° C. or higher. The preferred temperature for performing exposure to ethylene-active compound is 18.3° C. or lower.

Exposure of bananas to ethylene-active compound may be performed by any method. For example, bananas may be in an atmosphere that contains molecules, in gaseous form, of one or more ethylene-active compound. Gaseous ethylene-active compound may be introduced into the atmosphere surrounding the bananas by any method. For example, gaseous ethylene-active compound may be released into the atmosphere in such close proximity to bananas that the ethylene-active compound contacts the bananas before the ethylene-active compound diffuses far away from the bananas. For another example, the bananas may be in an enclosure (i.e., and airtight container enclosing a volume of atmosphere), and gaseous ethylene-active compound may be introduced into the enclosure.

In some embodiments in which gaseous ethylene-active compound contacts the bananas, the bananas are inside a permeable surrounding device, and ethylene-active compound is introduced into the atmosphere outside the permeable surrounding device. In such embodiments, the permeable surrounding device encloses one or more bananas and allows some contact between the ethylene-active compound and the bananas, for example by allowing some ethylene-active compound to diffuse through the permeable surrounding device or through holes in the permeable surrounding device or a combination thereof. Such a permeable surrounding device may or may not also qualify as an MAP as defined herein.

Among embodiments in which gaseous ethylene-active compound is introduced into an enclosure, the introduction may be performed by any method. For example, the ethylene-active compound may be created in a chemical reaction and vented to the enclosure. For another example, ethylene-active compound may be kept in a container such as a compressed-gas tank and released from that container into the enclosure.

Preferred are embodiments in which gaseous ethylene-active compound is introduced into an enclosure that also contains bananas. The preferred concentration of ethylene-active compound in the atmosphere inside the enclosure is 20 ppm or higher; more preferably 50 ppm or higher; more preferably 100 ppm or higher. The preferred concentration of ethylene-active compound in the atmosphere inside the enclosure is 1,000 ppm or less; or 500 ppm or less; or 300 ppm or less.

The preferred duration of the exposure of bananas to an atmosphere that contains ethylene-active compound is 8 hours or more; more preferably 16 hours or more; more preferably 20 hours or more. The preferred duration of the exposure of bananas to an atmosphere that contains ethylene-active compound is 48 hours or less; more preferably 36 hours or less; more preferably 24 hours or less.

Preferably, bananas are subjected to a ripening cycle, in which bananas are stored in a normal atmosphere at 18° C. or lower for one day or more subsequent to the end of exposure of bananas to an atmosphere that contains ethylene-active compound. In a preferred ripening cycle, bananas are exposed to an atmosphere containing ethylene-active compound for 20-28 hours at 13.3° C. to 18.3° C.; bananas are then kept in a normal atmosphere at the same temperature for 20-28 hours; and bananas are then stored in a normal atmosphere at 13.3° C. to 20° C. for a period of 1 to 6 days.

The method of the present invention involves contacting bananas with one or more cyclopropene compound. Such contacting may be performed by any method. For example, bananas may be in an atmosphere that contains molecules, in gaseous form, of one or more cyclopropene compound. Gaseous cyclopropene compound may be introduced into the atmosphere surrounding the bananas by any method. For example, gaseous cyclopropene compound may be released into the atmosphere in such close proximity to bananas that the cyclopropene compound contacts the bananas before the cyclopropene diffuses far away from the bananas. For another example, the bananas may be in an enclosure (i.e., and airtight container enclosing a volume of atmosphere), and gaseous cyclopropene compound may be introduced into the enclosure.

In some embodiments in which gaseous cyclopropene compound contacts the bananas, the bananas are inside a permeable surrounding device, and cyclopropene compound is introduced into the atmosphere outside the permeable surrounding device. In such embodiments, the permeable surrounding device encloses one or more bananas and allows some contact between the cyclopropene compound and the bananas, for example by allowing some cyclopropene compound to diffuse through the permeable surrounding device or through holes in the permeable surrounding device or a combination thereof. Such a permeable surrounding device may or may not also qualify as an MAP as defined herein.

Among embodiments in which gaseous cyclopropene compound is introduced into an enclosure, the introduction may be performed by any method. For example, the cyclopropene compound may be created in a chemical reaction and vented to the enclosure. For another example, cyclopropene compound may be kept in a container such as a compressed-gas tank and released from that container into the enclosure. For another example, cyclopropene compound may be contained in a powder or pellets or other solid form that contains encapsulated complex of cyclopropene compound in a molecular encapsulation agent. Such a complex is known herein as a "cyclopropene encapsulated complex."

In embodiments in which a molecular encapsulation agent is used, suitable molecular encapsulation agents include, for example, organic and inorganic molecular encapsulating agents. Preferred are organic molecular encapsulation agents. Preferred organic encapsulation agents include, for example, substituted cyclodextrins, unsubstituted cyclodextrins, and crown ethers. Suitable inorganic molecular encapsulation agents include, for example, zeolites. Mixtures of suitable molecular encapsulation agents are also suitable. In preferred embodiments of the invention, the encapsulation agent is alpha cyclodextrin, beta cyclodextrin, gamma cyclodextrin, or a mixture thereof. In some embodiments of the invention, particularly when the cyclopropene compound is 1 methylcyclopropene, the preferred encapsulation agent is alpha cyclodextrin. The preferred encapsulation agent will vary depending upon the structure of the cyclodextrin compound or compounds being used. Any cyclodextrin or mixture of cyclodextrins, cyclodextrin polymers, modified cyclodextrins, or mixtures thereof can also be utilized pursuant to the present invention.

The amount of molecular encapsulating agent can usefully be characterized by the ratio of moles of molecular encapsulating agent to moles of cyclopropene compound. In preferred embodiments, the ratio of moles of molecular encapsulating agent to moles of cyclopropene compound is 0.3:1 or higher; more preferably 0.9:1 or higher; more preferably 0.92:1 or higher; more preferably 0.95:1 or higher. Independently, in preferred embodiments, the ratio of moles of molecular encapsulating agent to moles of cyclopropene compound is 2:1 or lower; more preferably 1.5:1 or lower. In more preferred embodiments, the ratio of moles of molecular encapsulating agent to moles of cyclopropene compound is 0.95:1 to 1.5:1.

In some embodiments, a cyclopropene compound is introduced into an enclosure that contains bananas by placing cyclopropene encapsulation complex into the enclosure and then contacting the cyclopropene encapsulation complex with a release agent. A release agent is a compound that, when it contacts cyclopropene encapsulation complex, promotes the release of the cyclopropene compound into the atmosphere. In some embodiments, water (or a liquid that contains 50% or more water by weight, based on the weight of the liquid) is an effective release agent.

In preferred embodiments, a solid material containing cyclopropene encapsulation complex is placed into an enclosure that contains bananas, and water is brought into contact with that solid material. Contact with the water causes release of cyclopropene into the atmosphere of the enclosure. For example, the solid material may be in the form of tablets that contain, optionally among other ingredients, encapsulation complex that contains a cyclopropene compound and one or more ingredients that causes effervescence.

For another example, in some embodiments the solid material may be placed into an enclosure that contains bananas, and water vapor in the atmosphere may be effective as a release agent. In some of such embodiments, the solid material that contains cyclopropene encapsulated complex may be in a form that also contains, optionally among other ingredients, a water-absorbing compound such as, for example, a water-absorbing polymer or a deliquescent salt.

Also contemplated are embodiments in which bananas are brought into contact with a liquid composition that contains one or more cyclopropene compound. Among such liquid compositions, cyclopropene compound may be dissolved or dispersed in a liquid medium. In some embodiments involving liquid composition, a cyclopropene may be in an encapsulation complex with a molecular encapsulation agent, and the encapsulation complex may be dissolved or dispersed in a liquid medium.

In preferred embodiments of the present invention, atmosphere containing one or more cyclopropene compound in gaseous form is in contact with bananas (or is in contact with a permeable surrounding device that surrounds one or more banana). In such embodiments, all concentrations above zero of cyclopropene compound are contemplated. Preferably, the concentration of cyclopropene compound is 0.5 ppb or higher; more preferably is 1 ppb or higher; more preferably is 10 ppb or higher; more preferably 100 ppb or higher. Preferably, the concentration of cyclopropene compound is 100 ppm or lower, more preferably 50 ppm or lower, more preferably 10 ppm or lower, more preferably 5 ppm or lower.

MAP may be active or passive. Active MAP is packaging that is attached to some material or apparatus that adds certain gas or gases to the atmosphere inside the MAP and/or removes certain gas or gases from the atmosphere inside the MAP.

Passive MAP (or commodity generated modified atmospheres) takes advantage of the fact that bananas respire after harvest. Thus bananas placed in an enclosure, among other processes, consume oxygen and produce carbon dioxide. The MAP can be designed so that diffusion through the solid exterior surfaces of the MAP and passage of gas through any perforations that may be present in the exterior surface of the MAP maintain optimum levels of oxygen, carbon dioxide, and optionally other gases (such as, for example, water vapor or ethylene or both). In preferred embodiments, passive MAP is used.

Also contemplated are embodiments that employ active MAP. In the specification and claims herein, if MAP is not specifically stated to be active or passive, it is intended that the MAP may be either active or passive. For example, if it is stated herein that an MAP has a certain gas transmission characteristic, both of the following embodiments are contemplated: a passive MAP that has that gas transmission characteristic; and an active MAP that, when it contains bananas, maintains the same atmosphere within itself that would occur in a passive MAP that had that gas transmission characteristic.

A useful way to characterize the MAP is the gas transmission rate of the MAP itself in relation to the amount of bananas held in the MAP. Preferably, the rate of transmission of carbon dioxide is, in units of cubic centimeters per day per kilogram of bananas, 2,400 or higher; more preferably 5,000 or higher; more preferably 8,000 or higher. Preferably, the rate of transmission of carbon dioxide is, in units of cubic centimeters per day per kilogram of bananas, 120,000 or lower; more preferably 90,000 or lower. Preferably, the rate of transmission of oxygen is, in units of cubic centimeters per day per kilogram of bananas, 2,000 or higher; more preferably 4,000 or higher; more preferably 6,000 or higher. Preferably, the rate of transmission of oxygen is, in units of cubic centimeters per day per kilogram of bananas, 100,000 or lower; or 70,000 or lower.

It is useful to characterize the inherent gas transmission characteristics of a polymeric film. By "inherent" it is meant the properties of the film itself, in the absence of any perforations or other alterations. It is useful to characterize the composition of a film by characterizing the gas transmission characteristics of a film that has that composition and that is 30 micrometers thick. It is contemplated that, if a film of interest were made and tested at a thickness that was different from 30 micrometers (e.g., from 20 to 40 micrometers), it would be easy for a person of ordinary skill to accurately calculate the gas transmission characteristics of a film having the same composition and having thickness of 30 micrometers. The gas transmission rate of a film having thickness 30 micrometers is labeled "GT-30" herein.

One useful inherent characteristic of a polymeric film composition is herein called "film beta ratio," which is the ratio of the GT-30 for oxygen gas transmission rate to the GT-30 for carbon dioxide. Preferred polymeric film has film beta ratio of 1:4 or higher. By "1:4 or higher" is meant that the film beta ratio is 1:X, where X is greater than 4. More preferred MAP is made of material that has film beta ratio of 1:4.5 to 1:8.

In preferred embodiments, some or all of the exterior surface of the MAP is polymeric. Preferably, the polymer is in the form of a polymeric film. Some suitable polymeric films have thickness of 5 micrometer or more; or 10 micrometer or more; or 20 micrometer or more. Independently, some suitable polymeric films have thickness of 200 micrometer or less; or 100 micrometer or less; or 50 micrometer or less.

Some suitable polymer compositions include, for example, polyolefins, polyvinyls, polystyrenes, polydienes, polysiloxanes, polyamides, vinylidene chloride polymers, vinyl chloride polymers, copolymers thereof, blends thereof, and laminations thereof. Suitable polyolefins include, for example, polyethylenes, polypropylenes, copolymers thereof, blends thereof, and laminations thereof. Suitable polyethylenes include, for example, low density polyethylene, ultralow density polyethylene, linear low density polyethylene, metallocene-catalyzed polyethylene, copolymers of ethylene with polar monomers, medium density polyethylene, high density polyethylene, copolymers thereof and blends thereof. Suitable polypropylenes include, for example, polypropylene and oriented polypropylene. In some embodiments, low density polyethylene is used. In some embodiments, copolymer of styrene and butadiene is used.

Preferred polymer compositions contain one or more polyolefin; more preferred is polyethylene; more preferred is metallocene-catalyzed polyethylene. More preferred polymer compositions contain one or more polyolefin and one or more copolymer of an olefin monomer with a polar monomer. By "copolymer" herein is meant the product of copolymerizing two or more different monomers. Suitable copolymers of an olefin monomer with a polar monomer include, for example, such polymers available from DuPont called Elvaloy™ resins. Preferred are copolymers of ethylene with one or more polar monomer. Suitable polar monomers include, for example, vinyl acetate, methyl acrylate, ethyl acrylate, butyl acrylate, acrylic acid, methacrylic acid, and mixtures thereof. Preferred polar monomers contain one or more ester linkage; more preferred is vinyl acetate. Among copolymers of ethylene with one or more polar monomer, the preferred amount of polar monomer is, by weight based on the weight of the copolymer, 1% or more; more preferably 2% or more; more preferably 3% or more. Among copolymers of ethylene with one or more polar monomer, the preferred amount of polar monomer is, by weight based on the weight of the copolymer, 18% or less; more preferably 15% or less; more preferably 12% or less; more preferably 9% or less; more preferably 7% or less.

In some embodiments, polymeric film is used that has no perforations. In some of such embodiments, the polymeric film is chosen or designed so that, when bananas are placed inside a container comprising polymeric film, levels of oxygen and/or carbon dioxide are maintained that preserve the desirable condition of the bananas better than ambient atmosphere would.

When it is stated herein that a container comprises polymeric film, it is meant that some or all of the surface area of the container consists of polymeric film, and the film is arranged so that molecules that are capable of diffusing through the polymeric film will diffuse between the inside of the container and the outside of the container in both directions. Such a container may be constructed so that one, two, or more separate portions of the surface area of the container consist of polymeric film, and the polymeric film portions may be the same composition as each other or may be different from each other. It is contemplated that such containers will be constructed so that the portion of the container surface that is not polymeric film will effectively block diffusion of gas molecules (i.e., the amount of gas molecules that diffuse through will be of negligible importance).

Preferred are film compositions for which the GT-30 for carbon dioxide at 23° C., in units of $cm^3/(m^2\text{-day})$, is 800 or higher; more preferred is 4,000 or higher; more preferred is 5,000 or higher; more preferred is 10,000 or higher; more preferred is 40,000 or higher. Preferred are films with GT-30 for carbon dioxide at 23° C., in units of $cm^3/(m^2\text{-day})$, of 150,000 or lower; more preferred is 80,000 or lower; more preferred is 60,000 or lower. Preferred are films with GT-30 for oxygen at 23° C., in units of $cm^3/(m^2\text{-day})$, of 200 or higher; more preferred is 1,000 or higher; more preferred is 3,000 or higher; more preferred is 7,000 or higher. Preferred are films with GT-30 for oxygen at 23° C., in units of $cm^3/(m^2\text{-day})$, of 150,000 or lower; more preferred is 80,000 or lower; more preferred is 40,000 or lower; more preferred is 20,000 or lower; more preferred is 15,000 or lower. Preferred are films with GT-30 for water vapor at 37.8° C., in units of g/(m²-day), of 10 or higher; more preferred is 20 or higher. Preferred are films with GT-30 for water vapor at 37.8° C., in units of g/(m²-day), of 330 or lower; more preferred is 150 or lower; more preferred is 100 or lower; more preferred is 55 or lower; more preferred is 45 or lower; more preferred is 35 or lower.

Another useful way to characterize an MAP is the "MAP beta ratio," which is defined herein as the ratio of the rate of transmission of oxygen of the MAP itself to the rate of transmission of carbon dioxide of the MAP itself. Preferably, the MAP beta ratio is 1:1.03 or higher (i.e., 1:Y, where Y is greater than or equal to 1.03); more preferably 1:1.05 or higher. Preferably, the MAP beta ratio is 1:5 or lower; more preferably 1:3 or lower.

In preferred embodiments, polymeric film is used that has perforations. In preferred such embodiments, the holes have mean diameter of 5 micrometers to 500 micrometers. In preferred embodiments involving perforations, the holes have mean diameter of 10 micrometers or more; more preferably 20 micrometers or more; more preferably 50 micrometers or more; more preferably 100 micrometers or more. Independently, in preferred embodiments involving perforations, the holes have mean diameter 300 micrometers or less; more preferably 200 micrometers or less. If a hole is not circular, the diameter of the hole is considered herein to be 2 times the square root of the quotient of the area of the hole divided by pi.

In preferred embodiments, the MAP comprises polymeric film that is perforated. The preferred number of holes is determined in part by the weight of bananas that will be present in the MAP. In preferred embodiments, the number of holes per kilogram of bananas in the MAP enclosure is 10 or more; more preferably 20 or more; more preferably 40 or more. In preferred embodiments, the number of holes per kilogram of bananas in the MAP enclosure is 300 or fewer; more preferably 150 or fewer.

Among embodiments in which the MAP comprises polymeric film that is perforated, the preferred total area of the holes, in units of square micrometer per kilogram of bananas, is 50,000 or more; more preferably 100,000 or more; more preferably 150,000 or more. Among embodiments in which the MAP comprises polymeric film that is perforated, the preferred total area of the holes, in units of square micrometer per kilogram of bananas, is 6,000,000 or less; more preferably 3,000,000 or less; more preferably 2,000,000 or less.

In preferred embodiments, the MAP comprises polymeric film, and the percent of the surface area of the MAP that consists of the polymeric film is 10% to 100%; more preferably 50% to 100%; more preferably 75% to 100%; more preferably 90% to 100%. An MAP in which 90% to 100% of the surface area consists of polymeric film is known herein as a "bag." Preferred are MAP that comprise polymeric film and in which all portions of the surface of the MAP that are not polymeric film effectively block diffusion of gas molecules. In embodiments in which the MAP comprises polymeric film and the remainder of the surface of the MAP effectively blocks diffusion of gas molecules, the MAP is considered to be passive MAP.

Holes in polymeric film may be made by any method. Suitable methods include, for example, laser perforation, hot needles, flame, low-energy electrical discharge, and high-energy electrical discharge. One preferred method is laser perforation. Among embodiments in which laser perforation is used, it is preferred to design or select polymeric film that is well suited to laser perforation. That is, the polymeric film is designed or selected so that the laser easily makes holes that are round and have predictable size. Preferred laser is a carbon dioxide laser. For different polymeric film compositions, the appropriate wavelength of laser light may be chosen. For polymeric films that contain polyethylene and/or copolymers of ethylene with one or more polar monomer, it is preferred to choose a carbon dioxide laser producing infrared light that includes infrared light of wavelength 10.6 micrometer.

The bananas used in the practice of the present invention may be any members of the genus *Musa*. In some embodiments of the present invention edible fruits of the genus *Musa* are used. In some embodiments, plantains or bananas that are not plantains are used. In some embodiments, bananas that are not plantains are used. In some embodiments, bananas of the species *M. acuminata Colla* or the hybrid *M. X paradisiaca* L. are used. In some embodiments, members of one or more of the following varieties of banana are used: Sucrier, Lady Finger, Gros Michel, Cavendish (including, for example, Dwarf Cavendish, Giant Cavendish, Pisang masak hijau, Robusta, or Valery), Bluggoe, Ice Cream, Mysore, Salembale, Rasabale, Pachabale, Chandrabale, Silk, Red, Fehi, Golden Beauty, or Orinoco. In some embodiments, one or more variety of plantains is used, including, for example, French plantain, Horn plantain, Maaricongo, Common Dwarf, Pelipita, Saba, Harton, Dominico-Harton, or Currare.

In preferred embodiments of the present invention, bananas are harvested when they are green. Preferably, bananas are harvested at 11 to 14 weeks of age.

In some embodiments, bananas are harvested and immediately placed into MAP. In some embodiments, the time from harvest to placement into MAP is 14 days or less, more preferably 7 days or less, more preferably 2 days or less. In some embodiments, harvested bananas are placed into MAP prior to shipment, and the harvested bananas remain in the MAP during shipment. In some embodiments, bananas are shipped to a destination that is near the intended point of sale to consumers. As used herein, "near the intended point of sale to consumers" means a location from which it is capable to transport the bananas to the point of sale to consumers in 3 days or fewer by truck or other surface transportation.

In some embodiments of the present invention, bananas are placed into an MAP after harvest and prior to shipment. In some of such embodiments, the MAP may be placed in a carrying device. The carrying device provides some structure for ease of carrying the MAP and for strength in stacking the carrying devices during transportation. Carrying devices allow free exchange of gas between the inside and the outside of the carrying device. A typical suitable carrying device is, for example, a cardboard box with large holes (for example, round holes with diameter 20 mm or greater). In some embodiments, bananas are shipped in an MAP that is in a carrying device to a destination near the intended place of sale to consumers.

In some embodiments of the present invention, bananas are contacted with a cyclopropene compound while they are in an MAP. In some embodiments, bananas are contacted with ethylene-active compound while they are in an MAP and then, while they are in that same MAP, they are subsequently contacted with a cyclopropene compound.

In preferred embodiments, bananas are processed as follows. Bananas are exposed to ethylene-active compound and then are allowed to ripen until their color rating is 2 to 6 on the 7-stage scale; those bananas are then exposed to a cyclopropene compound. More preferred is exposing bananas to a cyclopropene compound when the bananas have color rating of 2.5 or higher. More preferred is exposing bananas to a cyclopropene compound when the bananas have color rating of 5.5 or lower; more preferred when the bananas have color rating of 4.5 or lower; more preferred when the bananas have color rating of 3.5 or lower.

In preferred embodiments of the present invention, bananas are exposed to a cyclopropene compound. Subsequent to that exposure to a cyclopropene compound, the bananas are kept in an MAP for a time period that is herein called TP1. TP1 includes at least a time interval that is herein called TI1. TI1 is a continuous time interval with duration of 1 hour. That is, the bananas are definitely kept in an MAP for a continuous time interval that lasts 1 hour (TI1). The time interval TI1 is part of a time period TP1 that may be the same as TI1 or that may be larger than TI1. If TP1 is larger than TI1, it may be larger by a small amount or a large amount; TP1 may be larger than TI1 by one or more hours, one or more days, or one or more weeks. The time period TP1 may begin prior to TI1, or TP1 may continue after the end of TI1, or both.

When it is stated herein that bananas are kept in an MAP for time interval TI1, it is meant that, if the bananas are already in an MAP at the beginning of TI1, the bananas remain in the MAP throughout TI1. It is also meant that, if the bananas are not in an MAP at the beginning of TI1, the bananas are placed into an MAP at the beginning of TI1 and remain therein throughout TI1.

In preferred embodiments of the present invention, bananas are kept in an MAP during time interval TI1. TI1 begins after the conclusion of exposing bananas to a cyclopropene compound. TI1 may begin immediately after the conclusion of exposing bananas to a cyclopropene compound, or TI1 may begin at any time thereafter, up to 72 hours after the conclusion of exposing the bananas to a cyclopropene compound.

By "conclusion of exposing the bananas to a cyclopropene compound," it is meant herein a time after which bananas have been exposed to a cyclopropene compound as described herein and at which the concentration of cyclopropene compound in the atmosphere around the bananas (or the atmosphere around the permeable surrounding device, if the bananas were in a permeable surrounding device during exposure to cyclopropene compound) falls below 0.5 ppb.

In preferred embodiments, the interval between the conclusion of exposing bananas to a cyclopropene compound and the start of TI1 is 48 hours or less; more preferably 36 hours or less; more preferably 24 hours or less; more preferably 12 hours or less; more preferably 6 hours or less; more preferably 3 hours or less; more preferably 1 hour or less. Unless explicitly stated otherwise, embodiments described herein with statements that TI1 starts a certain number hours or less after conclusion of exposing bananas to a cyclopropene compound include embodiments in which bananas are in an MAP during exposure to a cyclopropene compound and remain in the MAP for at least the time interval TI1.

In preferred embodiments, TP1 extends 11 or more hours beyond the end of TI1. That is, bananas remain in an MAP throughout TI1 and then remain in the MAP for an additional 11 hours or more. In more preferred embodiments, TP1 extends beyond the end of TI1 by 23 hours or more; more preferably by 47 hours or more; more preferably by 71 hours or more.

In some embodiments (herein called "post-CP" embodiments), bananas are not in MAP during exposure to a cyclopropene compound. In other embodiments (herein called "pre-CP" embodiments), bananas are in MAP during exposure to a cyclopropene compound. It is contemplated that any post-CP embodiment may be combined with any of the preferred embodiments described herein. It is also contemplated that, independently, any pre-CP embodiment may be combined with any of the preferred embodiments described herein.

Among post-CP embodiments, prior to exposure to a cyclopropene compound, bananas may be placed in any type of container (e.g., any bag, box, enclosure, carrier, or combination thereof), including, for example, containers that are not MAP and/or containers that are MAP. In preferred post-CP embodiments, the time from the conclusion of exposure to a cyclopropene compound to the placement of bananas into MAP is 12 hours or less; more preferably 8 hours or less; more preferably 4 hours or less. In preferred post-CP embodiments, the time from the conclusion of exposure to a cyclopropene compound to the removal of bananas from MAP is 24 hours or more; more preferably 48 hours or more; more preferably 72 hours or more.

In preferred post-CP embodiments, bananas are placed into MAP at color stage 4 or lower. For example, if some bananas were to ripen relatively quickly and reach color stage 4 in less than 72 hours after conclusion of exposure to a cyclopropene compound, it would be preferred to place those bananas into MAP as soon as they reached color stage 4 without waiting until 72 hours after conclusion of the exposure to cyclopropene compound.

Among pre-CP embodiments, bananas may be placed into MAP at any time prior the beginning of exposure to a cyclopropene compound. Bananas may be placed into an MAP and removed and then re-placed into an MAP prior to the beginning of exposure to a cyclopropene compound. In preferred pre-CP embodiments, bananas are placed into an MAP and then remain in that MAP at least throughout exposure to a cyclopropene and throughout TI1. In some pre-CP embodiments, bananas are placed into an MAP prior to exposure to ethylene, and then the bananas remain in that MAP at least throughout exposure to a cyclopropene and throughout TI1. In some pre-CP embodiments, bananas are placed into an MAP at a moment that is either immediately after harvest or is within 2 days after harvest, and then the bananas remain in that MAP at least throughout exposure to a cyclopropene and throughout TI1

It is contemplated that preferred MAP is chosen or designed so that, when bananas are placed into the MAP and the MAP, with the bananas inside, is then exposed ethylene-active compound and exposed to a cyclopropene compound, and then stored for 10 days at 16.7° C., a certain preferred atmosphere will be present in the MAP. In that preferred atmosphere, the amount of carbon dioxide, by volume based on the volume of the atmosphere inside the MAP, is 7% or more; more preferably 8% or more. In that preferred atmosphere, the amount of carbon dioxide, by volume based on the volume of the atmosphere inside the MAP, is 21% or less; more preferably 19% or less. In that preferred atmosphere, the amount of oxygen, by volume based on the volume of the atmosphere inside the MAP, is 6% or more; more preferably 8% or more. In that preferred atmosphere, the amount of oxygen, by volume based on the volume of the atmosphere inside the MAP, is 13% or less; more preferably 12.5% or less.

EXAMPLES

Each cluster of bananas was rated daily for sugar spots. Clusters were rated using the following scale:
0=no spots; 1=few spots; 2=moderate spots; 3=severe spots
Clusters with rating of 0-1 are commercially desirable to consumers. Clusters with ratings of 2-3 are unacceptable to consumers. In the results below, the average rating for all the clusters in a given treatment group is reported.

Bananas may be inspected for the incidence of crown mold. Crown mold is observed and given a numerical rating as follows: 0 (apparently healthy and disease-free fruit); 1 (mycelia not easily detectable with naked eye, but obvious slight disease is visible on the crown); 2 (presence of some visible mycelia on the crown and moderate disease damage on the crown; 3 (clearly visible mycelia on the crown with severe disease damage on the crown).

Bananas may be inspected for the incidence of crown rot. When disease damage is apparent but no fungus is visible, crown rot is reported, with the degree of damage assessed as follows: 0 (apparently healthy and disease-free fruit); 1 (obvious slight disease is visible on the crown); 2 (moderate disease damage on the crown; 3 (severe disease damage on the crown).

The color of banana peels is rated according to a seven stage rating scale: stage 1 (dark green); stage 2 (all light green); stage 3 (half green and half yellow); stage 4 (more yellow than green); stage 5 (green tips and necks); stage 6 (all yellow; maybe light green necks, no green tips); stage 7 (yellow flecked with brown). Consumers generally prefer to eat bananas in stage 5 or stage 6.

The materials used in the following Examples were these:

EVA1=ELVAX™ 3124 resin (DuPont Co.), Ethylene/Vinyl Acetate resin with 9% vinyl acetate by weight, based on the weight of the EVA, with melt index (ASTM D1238 190° C./2.16 kg) of 7 g/10 minute.

m-LLDPE=EXCEED™ 1018 resin (Exxon-Mobil Co.), metallocene Linear Low Density Polyethylene with a melt index (ASTM D1238, 190° C./2.16 kg) of 1.0 g/10 minutes and with density (ASTM D792) of 0.918 g/cm$^3$.

Slip A=diatomaceous earth (15% by weight based on the weight of Slip A) in polyethylene.

Slip B=stearamide (10% by weight based on the weight of Slip B) in ethylene/vinyl acetate copolymer.

Slip-AB=Mixture of Slip A and Slip B, with weight ratio of Slip A to Slip B of 3.0 to 2.5.

ELITE™ 5400G=Enhanced Polyethylene resin (metallocene polyethylene) available from The Dow Chemical Company with a melt index (ASTM D1238 190 C/2.16 kg) of 1.0 g/10 minutes, a density (ASTM D792) of 0.916 g/cm$^3$;

CN 734=an antiblock containing masterbatch available from several different vendors with targeted amount of 15% diatomaceous earth by weight in 85% polyethylene.

CN 706=a stearamide (slip) containing masterbatch available from several different vendors with targeted amount of 10% by weight in 90% ethylene vinyl acetate copolymer.

ELVAX 3170=ethylene-vinyl acetate copolymer available from Dupont Polymers with a melt index (ASTM D1238 190 C/2.16 kg) of 2.5 g/10 minutes and 18 wt % vinyl acetate.

10090=masterbatch available from Ampacet which contains 5% slip in an 8 MI LDPE base resin 10063=masterbatch also available from Ampacet which contains 20% diatomaceous earth in an 8 MI LDPE base resin.

The MAP bags used in the following Examples were made by producing film, then perforating that film, then making bags from the perforated film. The film was a three-layer coextrudate that was blown to produce film of thickness 29.5 micrometer (1.16 mil). The volume ratio of the layers was this:

first layer/second layer/third layer=30/40/30.

Each layer was a blend of EVA, m-LLDPE, and, optionally, Slip-AB. The weight ratios were as follows:

first layer: EVA1/m-LLDPE/Slip-AB=46/52/2 second layer: EVA1/m-LLDPE/Slip-AB=46/54/0 third layer: EVA1/m-LLDPE/Slip-AB=46/50/4

The film was perforated using a laser to give average hole diameter of 105 micrometer. Film was folded to form rectangles of 48 cm by 30 cm (18.75 inch by 12 inch) and sealed on three sides to form bags. Each bag had 88 holes.

Two versions of MAP bags were used, herein labeled "M" type MAP bags and "D" type MAP bags. Both types used the similar ingredients and were made as described above; the differences are that they used different grades of metallocene polyethylene and they were made at different facilities. The D bags had holes located differently from the location of holes in the M bags. In the Examples below, if MAP bags are mentioned and the type (i.e., M or D) is not stated, MAP bags of type M were used.

Details of the preparation of the D bags were as follows. Film was produced at The Dow Chemical Company in Findlay, Ohio on a 3 layer co-extrusion blown film line. Layer 1 was the inside of the film roll and consisted of 20% of the total film, the core layer (Layer 2) located between the inner layer and outer layer consisted of 60% of the total film and the outer layer (Layer 3) consisted of 20% of the total film structure. Each layer consisted of a blend of the various components as given in the table below. Edge reclaim was added to the core layer at no more than 20% of the total feed to this extruder. The outer layer was treated by corona discharge to a targeted 42 dyne level. Film formulations for the film used in making the D bags were as follows:

| Layer | Extruder | Layer Ratio (vol %) | Component Name | Layer Comp. (wt %) |
|---|---|---|---|---|
| 1 | Inner | 20 | ELITE ™ 5400G | 50.0 |
|   |   |   | ELVAX ® 3124 | 44.5 |
|   |   |   | CN 734 | 3.0 |
|   |   |   | CN 706 | 2.5 |
| 2 | Core | 60 | ELITE ™ 5400G | 54 |
|   |   |   | ELVAX ® 3124 | 46 |
| 3 | Outer | 20 | ELITE ™ 5400G | 50.0 |
|   |   |   | ELVAX ® 3124 | 44.5 |
|   |   |   | CN 734 | 3.0 |
|   |   |   | CN 706 | 2.5 |

Process conditions for making the film used for the D bags were as follows:

| | |
|---|---|
| Target Gauge, micrometers (Mils) | 29.2 (1.15) |
| Inner Extruder Temperatures | |
| Zone # 1-4, ° C. (° F.) | 149-193 (300-380) |
| Melt Temp, ° C. (° F.) | 212 (414) |
| Core Extruder Temperatures | |
| Zone # 1-6, ° C. (° F.) | 149-193 (300-380) |
| Melt Temp, ° C. (° F.) | 222 (431) |
| Outer Extruder Temperatures | |
| Zone # 1-6, ° C. (° F.) | 149-193 (300-380) |
| Melt Temp, ° C. (° F.) | 216 (421) |
| Die Temperatures ° C. (° F.) | 193 (380) |

Properties of the film used in making the D bags were as follows:

| Test | Method[2] | Results |
|---|---|---|
| Thickness micrometer (mil) | ASTM D374 | 29.5 (1.16) |
| Haze, % | ASTM D1003 | 11.7 |
| Clarity, % | ASTM D1746 | 88.1 |
| 1% Secant Modulus, MD, MPa (psi) | ASTM D882 | 129.4 (18,760) |
| 1% Secant Modulus, TD, MPa (psi) | ASTM D882 | 164.2 (23,820) |
| Tensile Toughness, MD, MPa (psi) | ASTM D882 | 87.7 (12,720) |
| Tensile Toughness, TD, MPa (psi) | ASTM D882 | 86.0 (12,470) |
| Elmendorf Tear, MD, g/micrometer (g/mil) | ASTM D1922 | 3.07 (78) |
| Elmendorf Tear, TD, g/micrometer (g/mil) | ASTM D1922 | 22.1 (562) |
| carbon dioxide transmission at 100% MOCON PERMATRAN-C ™ 4/41 23° C. cm$^3$/(m$^2$-day) | ASTM F2476 | 41,400 |
| oxygen transmission at 100% MOCON OX-TRAN 23.1° C. cm$^3$/(m$^2$-day) | ASTM D3985 | 8,550 |
| water transmission rate MOCON PERMATRAN-W WVTR 37.8° C. ambient g/(m$^2$-day) | ASTM D1249 | 29.4 |

Note
[2]ASTM methods are published by the American Society for Testing and Materials, West Conshohocken, PA, USA.

The film was drilled with a beam compression laser processing system, and the resulting holes had a machine direction average size of 109 microns and a transverse direction average size of 104 microns. These films were formed into 48 cm by 30 cm (18.75 inch by 12 inch) bags.

A third version of MAP bags was used, herein called "D-40." The film that was used to make D-40 bags was made as follows. Film was produced on a 7 layer Alpine blown film line. The film is a gusseted tube of 55.9 cm (22 inches wide) with 17.8 cm (7 inch) gussets on each side. Proportions were as follows:

| Layer | Component | Amount | Component | Ratio[3] | Thick[4] |
|---|---|---|---|---|---|
| 1 | 1 | 64.5% | Elite 5400G | 10 | 2.5 |
|  | 2 | 22.5% | Elvax 3170 |  |  |
|  | 3 | 10.0% | 10090 |  |  |
|  | 4 | 3.0% | 10063 |  |  |
| 2 | 1 | 64.5% | Elite 5400G | 10 | 2.5 |
|  | 2 | 22.5% | Elvax 3170 |  |  |
|  | 3 | 10.0% | 10090 |  |  |
|  | 4 | 3.0% | 10063 |  |  |
| 3 | 1 | 77.0% | Elite 5400G | 20 | 5 |
|  | 2 | 23.0% | Elvax 3170 |  |  |
| 4 | 1 | 77.0% | Elite 5400G | 20 | 5 |
|  | 2 | 23.0% | Elvax 3170 |  |  |
| 5 | 1 | 77.0% | Elite 5400G | 20 | 5 |
|  | 2 | 23.0% | Elvax 3170 |  |  |
| 6 | 1 | 64.5% | Elite 5400G | 10 | 2.5 |
|  | 2 | 22.5% | Elvax 3170 |  |  |
|  | 3 | 10.0% | 10090 |  |  |
|  | 4 | 3.0% | 10063 |  |  |
| 7 | 1 | 64.5% | Elite 5400G | 10 | 2.5 |
|  | 2 | 22.5% | Elvax 3170 |  |  |
|  | 3 | 10.0% | 10090 |  |  |
|  | 4 | 3.0% | 10063 |  |  |

Note
[3]weight ratio of layer to total film (%)

Note
[4]targeted thickness of layer (micrometers)

The same temperature profile is set the same for all 7 extruders at: Zone 1=149° C. (300 F), Zone 2=218° C. (425 F), Zone 3=177° C. (350 F), and Zone 4=221° C. (430 F) and barrier screws are installed in all 7 extruders. The targeted film thickness was 29.2 micrometer (1.15 mil).

The film that was used to make D-40 bags had the following properties:

| Test | Method | Results |
|---|---|---|
| Thickness micrometers (mil) | ASTM D374 | 30.2 (1.19) |
| Haze, % | ASTM D1003 | 9.3 |
| Clarity, % | ASTM D1746 | 91.2 |
| 1% Secant Modulus, MD, MPa (psi) | ASTM D882 | 113.3 (16,140) |
| 1% Secant Modulus, TD, MPa (psi) | ASTM D882 | 156.6 (22,705) |
| Tensile Toughness, MD, MPa (psi) | ASTM D882 | 68.3 (9,905) |
| Tensile Toughness, TD, MPa (psi) | ASTM D882 | 75.5 (10,950) |
| Elmendorf Tear, MD, g/ micrometer (g/mil) | ASTM D1922 | 3.11 (79) |
| Elmendorf Tear, TD, g/ micrometer (g/mil) | ASTM D1922 | 23.2 (590) |
| carbon dioxide transmission at 100% MOCON PERMATRAN-C ™ 4/41 23° C. cm$^3$/(m$^2$-day) | ASTM F2476 | 49,150 |
| oxygen transmission at 100% MOCON OX-TRAN 23° C. cm$^3$/(m$^2$-day) | ASTM D3985 | 7,980 |
| water transmission rate MOCON PERMATRAN-W WVTR 37.8° C. ambient g/(m$^2$-day) | ASTM D1249 | 30 |

The film was drilled with a beam compression laser processing system, and the resulting holes had a machine direction average size of 124 micrometers and a transverse direction average size of 123 micrometers.

To make D-40 bags, the gusseted tube was cut and sealed to make bags 178 cm long. D-40 bags are the size that is commonly used to carry 18 kg (40 lb) of bananas. The total number of perforations per bag was 2,735.

Example 1

Bananas Placed in MAP at Harvest; Transported Long Distance

Bananas were harvested in Columbia and placed in bags. Three types of bags were used:
(1) non-MAP polymeric film bag, sized to hold 18 kg of bananas ("poly liner"). Each bag has two or more holes, each with diameter of approximately 20 mm or larger.
(2) non-MAP polymeric film bag with 44 large holes (hole diameter 10 mm), sized to hold 1.4 kg of bananas ("T-bag"); and
(3) MAP bag (as described above), sized to hold about 1.4 kg of bananas.

The appropriate weight of bananas was placed in each type of bag after harvest and prior to shipment. Bags were placed in standard cardboard carrying devices. Bananas then were shipped to Philadelphia, Pa., where they were exposed to ethylene using a standard 4 day ripening schedule. Standard commercial methods of shipment and exposure to ethylene were used.

The Test Protocol that was used was as follows. 312 MAP bags were packed. Each bag held approximately 1.4 kg (3 lb) of bananas. Thirteen such bags were packed in each box. Total weight of bananas in MAP bags was approximately 432 kg. Approximately 216 kg of bananas were placed into poly liners, which were placed into boxes identical to those used for the MAP bags. Approximately 216 kg of bananas were placed into T bags, which were placed into boxes identical to those used for the MAP bags. The gross fruit weight of the each box was approximately 19.5 kg (43 lb).

Banana heads (industry nomenclature is rasimo) were harvested at 14 weeks of age (typical for US markets). Heads were cut into large, medium and small hands. The hands were washed in chlorinated water tanks. The washed hands were further broken into clusters. Clusters were packed into bags that each held approximately 1.4 kg (3 lb) or bags that each held approximately 18 kg (40 lb). Bags were placed into standard cardboard boxes, and each box held approximately 18-20 kg. Each box had 8 round holes of diameter 40 mm, plus two larger oval holes that also served as hand-holds for carrying.

The MAP-packaged bananas were packaged as follows: Clusters of approximately 1.4 kg were carefully placed into microperforated bags, and the bags were sealed by twisting the open side of the bag, folding down the twisted end, and placing a rubber band around the twisted and folded end of the bag.

All bananas were quickly cooled to 13.3° C. and held at that temperature for shipping. During shipping, air ventilation was approximately 15%.

Bags were not opened during shipping or ripening. Temperature was monitored in some of the bags by placing a temperature probe in one banana in that bag prior to sealing.

Bananas were ripened in forced-air ripening rooms as follows. On day 1, bananas were kept at 18° C. (64° F.) and exposed to exogenous ethylene (150 ppm for 24 hours). No further exogenous ethylene was used. After day 1, bananas were kept at 18° C. for two days and then at 10° C. for one day. The temperatures given are pulp temperatures and not room temperatures. Humidity was 85% to 95%.

Bananas were then shipped to Spring House, Pa. Bananas arrived at color stage 2.5-3. The bananas were randomly divided into treatment sets as follows:

| Number of cases | Bag Type    | Control | 0.3 ppm MCP | 1 ppm MCP |
|-----------------|-------------|---------|-------------|-----------|
| 12 cases        | poly liners | 3 cases | 5 cases     | 4 cases   |
| 24 cases        | MAP bags    | 9 cases | 7 cases     | 8 cases   |
| 12 cases        | T bags      | 4 cases | 4 cases     | 4 cases   |

The treatment group with MAP bags and with non-zero MCP are examples of the present invention. All other treatment groups are comparative.

On the same day the bananas arrived in Spring House, each treatment set was marked, placed in a tent in treatment trailer and equilibrated to 10° C. (58° F.) and 70% to 80% relative humidity. All tents were of equal size and packed the same way. Treatment was for 12 hr. In the tents for the two "MCP" treatment groups, at the beginning of the treatment period, SmartTabs™ tablets were placed in the tent and mixed with water, whereupon the tent was sealed. The amount of Smart-Tab™ tablets was chosen to achieve the indicated concentration of 1-methyl cyclopropene in the atmosphere of the tent.

After the treatment in the trailer, the cases were re-palleted and moved into a building at ambient conditions (approximately 20° C.) for storage and observation. The cases were opened and bananas re-oriented for evaluation and photography. The cases were placed in the storage room on shelves.

Bananas remained in the same bags throughout the packing, treatment in the trailer, and subsequent storage.

Evaluation for sugar spots was as follows. Day "zero" was the day the bananas were removed from the trailer and placed in storage. After a treatment group reached rating of 2.6 or higher, evaluation of sugar spots was discontinued because these bananas would no longer be acceptable to most consumers.

Sugar Spot Ratings

| Bag type    | ppb of MCP | Day 0 | 1 | 2    | 3    | 4    | 5    | 6    |
|-------------|------------|-------|---|------|------|------|------|------|
| T bags      | 0          | 0     | 0 | 0.06 | 0.89 | 2.72 | 3.00 |      |
| T bags      | 300        | 0     | 0 | 0    | 0.94 | 2.44 | 2.78 |      |
| T bags      | 1000       | 0     | 0 | 0    | 0.44 | 2.06 | 2.61 |      |
| poly liner  | 0          | 0     | 0 | 0.08 | 0.92 | 2.92 | 3.00 |      |
| poly liner  | 300        | 0     | 0 | 0.06 | 0.33 | 2.17 | 2.89 |      |
| poly liner  | 1000       | 0     | 0 | 0.00 | 0.33 | 2.67 | 2.89 |      |
| MAP         | 0          | 0     | 0 | 0.06 | 0.11 | 0.67 | 2.06 | 2.78 |
| MAP[1]      | 300        | 0     | 0 | 0.00 | 0.19 | 0.53 | 0.92 | 1.61 |
| MAP[1]      | 1000       | 0     | 0 | 0.11 | 0.22 | 0.56 | 1.56 | 1.89 |

Note
[1]Examples of the present invention

The results above show that the bananas treated by the method of the present invention have lower sugar spot ratings for a longer period of time than any other treatment groups.

Some additional observations were made of the bananas described above, in addition to the sugar spot evaluations. After day 10, the bananas treated according to the present invention had color rating of 6 or lower, while all the other bananas had color rating of 7 or above. At day 14, the bananas treated according to the present invention still had color rating of 6 or lower. Also at day 14, the bananas treated according to the present invention had peel that were desirably firm. In addition, at day 14, none of the bananas treated according to the present invention exhibited abscission of the individual fingers/bananas from the main bunch, in contrast to the comparative bananas which were all abscissing from the bunches by day 10.

Overall, our observations suggest that 1-MCP alone provided 1-2 days of additional shelf life to the bananas. MAP alone provided 2-3 days of additional shelf life to the bananas. However, the combined treatment was synergistic in that the visual quality of the bananas was maintained for an additional 10 days beyond the standard handling method.

Example 2

Bananas Packed into MAP at Harvest; Storage to Simulate Shipping

Bananas were harvested at 13 weeks of age. Fruit bunches were separated into hands, then washed, and excess latex was removed in chlorinated water tanks using standard commercial practices. The washed hands of bananas were further broken into clusters and treated with fungicide. Clusters were placed into plastic bags; each bag held approximately 1.4 kg (3 lbs) of bananas. The bananas remained in these bags until they were removed for evaluation (see below).

The plastic bags were either T bags or were modified-atmosphere bags ("MAP" bags). The T bags (also called "PE bags" herein) were typical of bags normally used in commerce for bananas. The bags were then placed into cartons. Each carton held 13 bags. Each carton either held MAP bags only or else held PE bags only. 20 cartons of MAP bags and 20 cartons of PE bags were prepared.

The cartons were placed in a refrigerated truck and transported to a storage facility. The distance from harvest to storage was approximately 100 km. The temperature in the refrigerated truck was 14 to 18° C. To simulate the effect of shipping over long distances, the cartons were placed in conventional cold storage room at 14° C. for two weeks. In storage, the cartons were placed so that air could circulate between and around each carton.

After the storage period, the thermostat of the holding room was raised to 18° C., and no further action was taken until the holding room was at 18° C. for 12 hours. Bananas were ripened using a 5-day schedule, as follows. The temperatures shown are pulp temperatures; if necessary, the thermostat was lowered so that pulp temperature remained at the desired temperature despite any respiration that may be taking place in the bananas.

day 0: 17.8° C. (64° F.), in normal air
day 1: 17.8° C. (64° F.), ethylene at 200 ppm for 24 hours
day 2: 17.8° C. (64° F.), room was vented for 30 min., then re-sealed.
day 3: 17.8° C. (58° F.)
day 4: 14.4° C. (58° F.)
day 5: 14.4° C. (58° F.)

On day 5 at approximately 4 pm, the cartons were divided in to seven groups: one untreated control ("UTC") group (6 cartons) and six treatment groups. Each group had equal number of PE cartons and MAP cartons. The six treatment groups were as follows:

| Treatment No. | Bag | Concentration of 1-MCP (ppb) | Number of Cartons |
|---|---|---|---|
| PE-0-C | PE | 0 | 4 |
| MAP-0-C | MAP | 0 | 4 |
| PE-3-C | PE | 300 | 8 |
| PE-10-C | PE | 1000 | 4 |
| MAP-3 | MAP | 300 | 8 |
| MAP-10 | MAP | 1000 | 4 |

Treatments with "C" in the treatment number are comparative examples.

UTC cartons were placed in a shed that had good ventilation. The remaining cartons remained in the holding room. Four airtight tents were erected in the holding room. Each tent held all the cartons for one of the treatment groups PE-3-C, PE-10-C, MAP-3, and MAP-10.

At day 5 at approximately 4 pm, the bananas had reached color stage 2.5 to 3.5. Treatment groups PE-3-C, PE-10-C, MAP-3, and MAP-10 were then exposed to 1-MCP overnight at the concentrations shown above.

Example 2A

Evaluation Process "A" (4 Days Post-MCP)

Some of the bananas from each group described in Example 2 were evaluated by process "A" as follows: After treatment groups PE-3-C, PE-10-C, MAP-3, and MAP-10 received exposure to 1-MCP, the bananas remained in their bags in the holding room at 14° C. for 4 days; then the bananas were removed from the bags and stored at approximately 22° C. for 7 days; then the bananas were evaluated. The results were as follows:

| Treatment No. | Color Stage (mean) | Sugar Spots (mean %) |
|---|---|---|
| PE-0-C | 7 | 100 |
| MAP-0-C | 7 | 100 |
| PE-3-C | 6.8 | 35 |
| PE-10-C | 6.9 | 73 |
| MAP-3 | 6.3 | 3 |
| MAP-10 | 6.1 | 2 |

COMMENTS: The table above shows that the samples with MAP and with non-zero 1-MCP had the most desirable results for color and for sugar spots. Main differences between treatments were detected four days and five days after exposure of the fruit to 1-MCP. MAP-0-C showed inferior quality to MAP-3 and MAP-10. Delay in sugar spot development of the fruit in MAP-3 and MAP-10 was at least three days longer than MAP-0.

Additional observations were as follows. ("ARB" means after removal from bag):

| Treatment No. | Comments |
|---|---|
| PE-0-C | Fruit reached color 7 at a faster rate. Fruit was over-ripe and at color stage 7 (or more ripe) at 1 day ARB. Severe problems on peel quality because of sugar spot covering most of the fruit surface. Detection of off-flavors. |
| MAP-0-C | Fruit reached color 7 at a faster rate. Fruit was over-ripe and in a non-commercial color stage at 3 days ARB.. Moderate to severe problems with sugar spot in all fruit. |
| PE-3-C | Some fruit was in a good color stage. However most clusters were showing increasing problems with sugar spot at day 1 ARB. Signs of water loss affecting general appearance of the fruit. |
| PE-10-C | Some fruit was in a good color stage. However most clusters were showing increasing problems with sugar spot at day 1 ARB. Signs of water loss affecting general appearance of the fruit. Some delay and un-even ripening detected. |
| MAP-3 | Fruit with excellent bright yellow color. Only high levels of sugar spot in a few clusters. Fruit in perfect stage (color) for final consumer sale at the end of the holding period. |
| MAP-10 | Almost all fruit was at the right color for sale, showing a bright yellow color of the peel. Fruit provide a excellent visual quality. Only 2% of the fruit was showing light levels of sugar spot. |

Example 2B

Evaluation Process "B" (3 Days Post-MCP)

This Example was the same as Example 2A, except that after exposure to 1-MCP, the bananas remained in their bags in the holding room at 14° C. for 3 days instead of 4 days. The MAP-3 and MAP-10 groups showed the same type of improvements over the comparative examples as in Example 2A.

Example 2C

Evaluation Process "C" (22° C. after MCP)

Some of the bananas from each group described in Example 2 were evaluated by process "C" as follows: After treatment groups PE-3-C, PE-10-C, MAP-3, and MAP-10 received exposure to 1-MCP, the bananas remained in their bags and were held at approximately 22° C. The bananas were inspected daily while they remained in the bags.

After 7 days at approximately 22° C., results were as follows:

| Treatment No. | Crown Mold | Crown Rot |
|---|---|---|
| PE-0-C | 2.09 | 2.06 |
| MAP-0-C | 2.00 | 1.91 |
| PE-3-C | 1.50 | 1.72 |
| PE-10-C | 1.09 | 1.27 |
| MAP-3 | 1.04 | 1.18 |
| MAP-10 | 1.00 | 1.18 |

The bananas that had both MAP and non-zero 1-MCP had better results than other bananas in both crown mold and crown rot.

Example 2X

Evaluation Process "X" (Extended Storage)

Some of the bananas from each group described in Example 2 were evaluated by process "X" as follows: After treatment groups PE-3-C, PE-10-C, MAP-3, and MAP-10 received exposure to 1-MCP, the bananas remained in their bags and were held at approximately 14° C. The bananas were inspected daily while they remained in the bags.

Holding the bananas at 14° C. provided a test of whether holding them at such low temperature would delay the onset of sugar spots. During the holding time at 14° C. after exposure to 1-MCP, the bananas in MAP that received non-zero 1-MCP showed a delay in the onset of sugar spots; in all other bananas, the onset of sugar spots was not delayed.

On day number 13 after treatment with 1-MCP, all bananas had become unacceptable (due to one or more of excessive sugar spots, excessively soft pulp, crown mold, crown rot, or separation at crown) except those in MAP bags that had received non-zero 1-MCP. All the unacceptable bananas were discarded.

On day number 17 after treatment with 1-MCP, the remaining bananas (i.e., those in MAP bags that had received non-zero 1-MCP) were still acceptable, and they were removed from the MAP bags and stored at room temperature (approximately 22° C.), and they then remained acceptable for an additional three days.

Example US-1

Bananas Transferred to MAP after Shipment

Bananas were harvested and shipped in to Ephrata, Pa., using standard commercial practices, in standard commercial shipping bags. For shipping, bags were placed in cartons; each carton held sufficient bags so that there were approximately 18.1 kg (40 lb.) of bananas in each carton.

After arrival in Ephrata, Pa., bananas were removed from the bags in which they were shipped and placed into new bags, which were either MAP (as described above) or T-bags (as described above). The new bags held approximately 1.3 kg (3 lb.) each. The new bags were twisted and secured shut. Bags were exposed to the 5-day ripening method used in Example 2 above. After ripening, the bags were transported to Spring House, Pa. in a refrigerated truck. Upon arrival, color stage of the bananas was 3.5 to 4.5. Bags were then placed into sealed tents for 12 hours at 13.3° C. (56° F.); during that 12-hour period, each tent had a normal air atmosphere in which 1-MCP was released in the amount of either zero, 300 ppb, or 1000 ppb. After that 12-hour period, samples were aired for 1 hour and then kept in place at 13.3° C. (56° F.) for 10 hours and then transferred to an evaluation room, which was maintained at 17.8° C. (64° F.).

All bags remained in the evaluation room for 8 days. Bananas were visually inspected each day, whether they were still in bags or not. The bags were divided into three groups:
A. remained in the bags for 3 days, then removed from the bags for the remaining 5 days;
B. remained in the bags for 4 days, then removed from the bags for the remaining 4 days.
C. remained in the bags for 8 days, then removed on the eighth day for evaluation.

The results were as follows. All three groups (A, B, and C) showed the same comparative trends in color development. Among the bananas that received zero 1-MCP, the bananas in MAP bags showed slower development of color and sugar spots than bananas in T-bags. Among the bananas that were in T-bags, the bananas that received 300 ppb or 1000 ppb of 1-MCP showed slower development of color and sugar spots. Bananas that received 1000 ppb of 1-MCP showed slower development of color and sugar spots than did the bananas in the same type of bag that received 300 ppb of 1-MCP.

Bananas in MAP that received either 300 ppb or 1000 ppb of 1-MCP showed much slower development of color and sugar spots than the bananas in T-bags. Bananas in MAP that received either 300 ppb or 1000 ppb of 1-MCP showed slower development of color and sugar spots after they were removed from their bags than did the bananas in MAP that received zero 1-MCP. Based on the overall quality of the fruit, compared to T bags with no 1-MCP, the shelf life was extended by 1 to 2 days in bananas with 1-MCP only (i.e., T bags with 1-MCP) or in bananas with MAP only (MAP with zero 1-MCP); the examples of the invention (bananas in MAP that received non-zero 1-MCP) showed extension of shelf life by 8 days.

Example US-3

Comparison of Production Batches of MAP

Bananas were harvested and shipped to Ephrata, Pa. as described in Example US-1 above. Upon arrival, bananas were removed from poly liners and placed into one of three types of bags:
(1) T-bags (as described above)
(2) MAP bags type M (as described above)
(3) MAP bags type D (as described above).
Bananas in bags were exposed to the ripening cycle described above, except that the first day ("day 0") of the ripening cycle was omitted. The bananas that were exposed to 1-MCP received that exposure when they were at color stage 2 to 2.2.

The trends among the groups were the same as those observed in Example US-1 above.

Additionally, a group of bananas remained in their bags at 17.8° C. for 17 days after exposure to 1-MCP and were evaluated at the end of those 17 days. Among those bananas, the bananas that both were in MAP and also received non-zero 1-MCP had lower color-stage numbers (as desired) and had lower number of sugar spots (as desired) than did either the bananas with MAP but no 1-MCP or the bananas in T-bags that received non-zero 1-MCP.

The procedure of holding the bananas at 17.8° C. delayed the development of sugar spots in the bananas that exemplified the present invention (i.e., MAP and non-zero 1-MCP), but the procedure of holding the bananas at 17.8° C. did not delay the development of sugar spots in any of the comparative bananas (i.e., bananas that did not have both MAP and non-zero 1-MCP).

Additionally, after 14 days at 17.8° C., the comparative bananas were broken at the necks, while the bananas that exemplified the present invention were not.

After 17 days at 17.8° C., the bananas that exemplified the present invention were removed from MAP and stored for an additional 4 days at 17.8° C. At the end of those 4 days, the bananas showed acceptable color stage and sugar spots.

There were no significant differences observed between bananas in MAP type M bags and bananas in MAP type D bags.

Example US-4

Placement into MAP after Exposure to 1-MCP

Bananas were harvested and shipped to Ephrata, Pa. as in Example US-1 above. The bananas were also ripened as in Example US-1, except that the bananas remained in the bags in which they were shipped (poly liners) throughout the ripening process. Some of the poly liners were exposed to 1-MCP (1000 ppb) as in Example US-1 above, while others were not. Immediately after the conclusion of the exposure to 1-MCP, bananas were removed from the poly liners, divided into bunches. Some bunches had approximately of 1.4 kg (3 lb) and were placed into T-bags as described above. Other bunches were approximately 18 kg (40 lb) and were placed into MAP type D-40 as described above, using standard layering technique that interposes layers of the bag in between layers of bananas. Then the bananas were stored and evaluated as in Example US-1. Also, the bananas were eaten, and the firmness of the pulp was evaluated along with the overall quality of the eating experience. The results observed on Day #8 were as follows:

| Treatment | Average color stage | Average sugar spot rating | pulp | eating experience |
|---|---|---|---|---|
| MAP only (zero 1-MCP) | 4.79 | 1.83 | soft | mediocre |
| 1-MCP only (T-bag) | 4.71 | 3 | soft | mediocre |
| MAP and 1-MCP | 4.42 | 1 | firm | excellent |

The samples with both MAP and 1-MCP were superior to the other samples in all evaluations.

Example US-5

Various Levels of 1-MCP

Bananas were grown, shipped, and ripened as described in Example US-1. All bananas were in T-bags through the ripening cycle. At color stage 3.0 to 4.0, the bananas, still in T-bags, were placed in various airtight containers; in each container, a specified concentration of 1-MCP was released into the air; bananas remained in those containers for 12 hours. After that, half of each treatment group was transferred to MAP bags, and all bananas were placed into post-MCP storage as in US-1. At the end of 7 days, bananas were evaluated for sugar spots (SS), color stage (CS), and firmness (F). Firmness was measured with a Fruit Texture Analyzer (Güss Company, Republic of South Africa) using a probe of 8 mm diameter. Average results were as follows:

| 1-MCP (ppb) | CS T-bag | CS MAP | SS T-bag | SS MAP | F (kg) T-bag | F (kg) MAP |
|---|---|---|---|---|---|---|
| 0 | 6.2 | 5.2 | 2.5 | 2.3 | 0.599 | 0.593 |
| 1 | 6.6 | 5.2 | 2.2 | 1.8 | 0.561 | 0.584 |
| 5 | 6.6 | 4.8 | 2.8 | 0.5 | 0.571 | 0.602 |
| 10 | 6.6 | 5.4 | 2.0 | 1.5 | 0.568 | 0.599 |
| 25 | 6.2 | 5.6 | 2.5 | 0.8 | 0.576 | 0.603 |
| 50 | 7.0 | 5.5 | 2.2 | 1.0 | 0.591 | 0.593 |
| 100 | 7.0 | 5.2 | 2.5 | 1.0 | 0.571 | 0.581 |
| 200 | 7.0 | 4.9 | 3.0 | 0.8 | 0.589 | 0.592 |
| 1000 | 7.0 | 6.2 | 3.0 | 1.8 | 0.601 | 0.617 |
| 5000 | 6.2 | 6.2 | 3.0 | 1.2 | 0.579 | 0.602 |
| 50000 | 6.6 | 5.6 | 2.8 | 2.5 | 0.563 | 0.585 |

At each level of –1MCP, the MAP samples showed equal or better color stage (i.e., lower color-stage numbers), better sugar spots (i.e., fewer sugar spots), and better firmness (i.e., higher firmness).

Example US-7a

Various Number of Bananas Per Bag (Appearance)

Bananas were handled and tested as in Example US-1, except that the number of bananas per bag was varied. Concentration of 1-MCP was 1,000 ppb. Also, two different types of MAP bags were used: type M and type D, as described above. Bananas were evaluated on day #7 after treatment with 1-MCP. Average results were as follows:

| | Average Observations on Day Number 7 | | | |
|---|---|---|---|---|
| | Color Stage | | Sugar Spots | |
| bananas per bag | MAP type D | MAP type M | MAP type D | MAP type M |
| 1 | 6.7 | 6.2 | 0.7 | 2.0 |
| 2 | 5.5 | 5.3 | 1.0 | 1.7 |
| 3 | 5.5 | 4.8 | 0.3 | 2.0 |
| 4 | 5.5 | 5.3 | 0.7 | 1.0 |
| 5 | 4.8 | 5.2 | 1.3 | 1.0 |
| 6 | 5.2 | 4.8 | 0.3 | 1.0 |
| 7 | 4.8 | 5.0 | 0.7 | 0.0 |
| 8 | 4.5 | 4.5 | 0.0 | 1.0 |
| 9 | 4.5 | 4.5 | 0.7 | 0.7 |
| 10 | 4.5 | 5.2 | 0.0 | 1.0 |
| 11 | 4.3 | 4.5 | 0.0 | 0.0 |
| 12 | 4.5 | 4.5 | 0.0 | 0.0 |

The MAP bags type M and the MAP bags type D perform similarly; no significant difference between them was observed.

Example US-7b

Various Number of Bananas Per Bag (Firmness)

Bananas were handled and tested as in Example US-1, except that the number of bananas per bag was varied. Also, bananas in MAP bags were compared to "no-bag" bananas (i.e., bananas that were not in any bags after shipping and that went through the ripening, 1-MCP exposure, and storage processes outside of any bag). Also tested were "no MCP" bananas that received no exposure to 1-MCP and that received the same pattern of storage conditions of time and temperature as the bananas exposed to 1-MCP. All bananas were evaluated on day number 5 after the treatment with 1-MCP. Firmness was tested as in Example US-5. Average Results were as follows:

| bananas | Firmness, kg (lb) | |
|---|---|---|
| per bag | no 1-MCP | 1000 ppb of 1-MCP |
| 1 | 0.61 (1.35) | 0.64 (1.41) |
| 3 | 0.61 (1.35) | 0.65 (1.42) |
| 5 | 0.57 (1.26) | 0.61 (1.42) |
| 7 | 0.53 (1.18) | 0.66 (1.46) |
| 9 | 0.59 (1.30) | 0.66 (1.46) |
| 12 | 0.64 (1.40) | 0.66 (1.46) |
| no-bag | 0.61 (1.35) | 0.62 (1.37) |

The bananas that received 1-MCP and also were stored in MAP bags had better firmness than comparable non-MCP bananas and better firmness than no-bag bananas.

Example US-7c

Various Number of Bananas Per Bag (Gas Transmission)

Bananas were handled and tested as in Example US-1, except that the number of bananas ("# of B") per bag was varied. Results for MAP bags type M were compared at 0 1-MCP ("MAP only") and at 1,000 ppb of 1-MCP ("MAP/MCP"). MAP only samples are comparative; MAP/MCP samples exemplify the present invention.

The gas transmission rates for the entire bag was found by measuring the gas transmission rates for a portion of the perforated film and then making a calculation based on the entire effective area of the bag. Gas transmission rates for the perforated films were measured using quasi-isostatic method as described by Lee et al. (Lee, D. S., Yam, K. L., Piergiovanni, L. "Permeation of gas and vapor," *Food Packaging Science and Technology*, CRC Press, New York, N.Y., 2008, pp 100-101).

Also, the sugar spots were assessed. In this experiment, the number of the day during the holding at 17.8° C. on which sugar spots developed is noted ("SS day"). Bananas in T-bags (with either 0 or 1,000 ppb of 1-MCP) developed sugar spots on day 3.

The results (each is an average of 3 bags) are shown in the following table. The characteristics reported are the following:

POT=$O_2$ transmission rate of the entire bag ($cm^3/m^2$-day per kg of bananas)
PCT=$CO_2$ transmission rate of the entire bag ($cm^3/m^2$-day per kg of bananas)
P area=total area of perforation of the entire bag (million micrometers squared per kg of bananas)

| | MAP only | | | | MAP/MCP | | | |
|---|---|---|---|---|---|---|---|---|
| # of B | POT | PCT | P area | SS day | POT | PCT | P area | SS day |
| 1 | 73,284 | 93,805 | 3.889 | 3 | 71,345 | 91,322 | 3.786 | 4 |
| 3 | 28,907 | 37,002 | 1.534 | 3 | 24,045 | 30,779 | 1.276 | 5 |
| 5 | 14,348 | 18,365 | 0.761 | 4 | 16,903 | 21,636 | 0.897 | 6 |
| 7 | 11,827 | 15,139 | 0.627 | 4 | 10,962 | 14,032 | 0.581 | 8 |
| 9 | 8,692 | 11,126 | 0.461 | 5 | 9,954 | 12,741 | 0.528 | 8 |
| 12 | 6,432 | 8,234 | 0.341 | 5 | 6,938 | 8,881 | 0.368 | 8 |

MAP only delayed sugar spot development (as desired) compared to T-bags, and MAP/MCP delayed sugar spot development (as desired) even more.

Example US-8

Variations in Hole Locations

Sixteen special bags were made in order to test the effect of variations in the locations of the holes. Each special bag was made from the same perforated films as used for MAP bags type M. Each special bag had the same dimensions as an MAP type M bag, but each special bag had 196 holes, half of which were blocked using pressure-sensitive adhesive tape. Bags #1 through #12 each had a unique pattern of location of the holes. Bags D1 and D2 were duplicate special bags that re-created the hole pattern of MAP bags type D. Bags M1 and M2 were duplicate special bags that re-created the hole pattern of MAP bags type M. The procedure of Example US-1 was followed, using the special bags as MAP bags. On day #8 after exposure to 1-MCP (level of 1,000 ppb of 1-MCP was used), the atmosphere inside each bag was measured to determine the weight % of carbon dioxide and the weight % of oxygen, based on the total weight of atmosphere inside each bag. The results were as follows:

| Special Bag Number | % $CO_2$ | % $O_2$ |
|---|---|---|
| 1 | 8.1 | 13.6 |
| 2 | 8.6 | 13.1 |
| 3 | 9.2 | 11.8 |
| 4 | 8.3 | 13.1 |
| 5 | 9.1 | 12.2 |
| 6 | 9.2 | 12.4 |
| 7 | 8.8 | 12.9 |
| 8 | 8.8 | 12.7 |
| 9 | 7.7 | 14.6 |
| 10 | 9.7 | 11.3 |
| 11 | 8.6 | 12.9 |
| 12 | 7.9 | 13.7 |
| D1 | 8.2 | 12.7 |
| D2 | 7.9 | 13.3 |
| M1 | 9.2 | 12.0 |
| M2 | 8.2 | 13.5 |

No significant differences among the hole arrangements were observed.

Example US-9

Laser Drilling of Perforations

Holes were drilled in polymeric films using carbon dioxide laser, operating at wavelengths that include 10.6 micrometers. The laser produced a pulse of infrared light. When films were used that were made of polyethylene only, some pulses produced a complete hole (i.e., a hole that penetrated all the way through the film) and some pulses did not. In the polyethylene-only films, the percentage of pulses that failed to produce a complete hole was unacceptably high. When films were tested with the compositions described above for the films used in making the various MAPs, nearly all pulses produced a complete hole; the percentage of pulses that failed to produce a complete hole was acceptably low.

We claim:
1. A method of handling bananas, comprising:
 (a) exposing said bananas to an atmosphere that contains one or more ethylene-active compounds selected from the group consisting of ethylene, ethylene release agents, and compounds with high ethylene activity;
 (b) after said step (a), exposing said bananas to an atmosphere that contains one or more cyclopropene com- pounds while said bananas have a color stage of from 2 to 6 on the seven-stage scale;

wherein said bananas are kept in a modified-atmosphere package for a time period that includes at least a time interval that lasts for 1 hour, wherein said time interval begins between the conclusion of said step (b) and 72 hours from the conclusion of said step (b); and wherein said modified-atmosphere package is formed from a polymeric film that is microperforated to include holes of 5 micrometers to 500 micrometers in diameter, and said modified-atmosphere package has a transmission rate of carbon dioxide for the entire package (PCT) of 2,400 to 120,000 cubic centimeters per day per kilogram of bananas.

2. The method of claim 1, wherein said modified-atmosphere package is constructed so that the transmission rate of oxygen for the entire package (POT) is from 2,000 to 100,000 cubic centimeters per day per kilogram of bananas.

3. The method of claim 1, wherein the ratio of said POT to said PCT is from 1:1.05 to 1:3.

4. The method of claim 1, wherein 10% to 100% of the surface area of said modified-atmosphere package is polymeric film, and wherein the portion of the surface area of said modified-atmosphere package that is not said polymeric film effectively blocks diffusion of gas molecules.

5. The method of claim 1, wherein said polymeric film has composition that, if it had thickness of 30 micrometers, would have inherent gas transmission rate of carbon dioxide of 20,000 to 100,000 $cm^3/m^2$-day and inherent gas transmission rate of oxygen of 5,000 to 60,000 $cm^3/m^2$-day.

6. The method of claim 1, wherein the total area of the perforations in said polymeric film is 50,000 to 6,000,000 square micrometer per kilogram of bananas.

7. The method of claim 1, wherein said step (b) is conducted while said bananas have a color stage of from 2.5 to 3.5 on the seven-stage scale.

8. The method of claim 1, wherein said step (b) is conducted by placing said bananas into an airtight container and providing an atmosphere in said airtight container that contains concentration of cyclopropene compound of 0.5 ppb to 100 ppm.

9. The method of claim 1, wherein said bananas are kept in said modified-atmosphere package for 48 hours or more.

10. The method of claim 1, wherein in said step (b) said bananas are exposed to the atmosphere that contains one or more cyclopropene compounds at a concentration of 0.5 ppb to 100 ppm.

11. The method of claim 1, wherein said one or more cyclopropene compounds comprises 1-methylcyclopropene.

12. The method of claim 1, wherein said bananas are contained in said modified-atmosphere package during step (a).

13. The method of claim 1, wherein said bananas are contained in said modified-atmosphere package during step (b).

14. The method of claim 1, wherein said bananas are contained in said modified-atmosphere package prior to said step (b), and wherein said bananas remain in said modified-atmosphere package from the time they are placed therein until 48 hours or more after the conclusion of said step (b).

15. A method of handling bananas, comprising:
    (a) exposing bananas to one or more ethylene-active compounds;
    (b) after step (a), exposing said bananas to one or more cyclopropene compounds; and
    (c) containing said bananas in a modified-atmosphere package for at least one continuous hour after the conclusion of said step (b),
    wherein said modified-atmosphere package comprises a polymeric film that is microperforated to include holes of 5 micrometers to 500 micrometers in diameter, and said modified-atmosphere package has a total area of the perforations of 50,000 to 6,000,000 square micrometer per kilogram of bananas.

16. The method of claim 15, wherein modified-atmosphere package has a transmission rate of carbon dioxide for the entire package (PCT) of 2,400 to 120,000 cubic centimeters per day per kilogram of bananas.

17. The method of claim 15, wherein said polymeric film has an inherent gas transmission rate of carbon dioxide of 20,000 to 100,000 $cm^3/m^2$-day and an inherent gas transmission rate of oxygen of 5,000 to 60,000 $cm^3/m^2$-day.

18. The method of claim 15, wherein said polymeric film comprises a material selected from the group consisting of polyolefins, polyvinyls, polystyrenes, polydienes, polysiloxanes, polyamides, vinylidene chloride polymers, vinyl chloride polymers, copolymers thereof, blends thereof, and laminations thereof.

19. A method of handling bananas, comprising:
    (a) exposing said bananas to an atmosphere that contains one or more ethylene-active compounds while said bananas are contained in a modified-atmosphere package;
    (b) after said step (a) and while said bananas remain in said modified-atmosphere package, introducing at least one cyclopropene compound to an atmosphere outside said modified-atmosphere package and allowing the at least one cyclopropene compound to diffuse through said modified-atmosphere package to contact with said bananas contained therein; and
    (c) maintaining said bananas in same modified-atmosphere package for at least one continuous hour after the conclusion of said step (b),
    wherein said modified-atmosphere package is formed from a polymeric film that is microperforated to include holes of 5 micrometers to 500 micrometers in diameter.

20. The method of claim 19, wherein said modified-atmosphere package has a transmission rate of carbon dioxide for the entire package (PCT) of 2,400 to 120,000 cubic centimeters per day per kilogram of bananas, and a transmission rate of oxygen for the entire package (POT) of 2,000 to 100,000 cubic centimeters per day per kilogram of bananas.

* * * * *